United States Patent
Komatsu et al.

(10) Patent No.: US 7,151,646 B2
(45) Date of Patent: Dec. 19, 2006

(54) FLEXIBLE DISK DRIVE

(75) Inventors: Hisateru Komatsu, Yamagata (JP); Makoto Takahashi, Yamagata (JP); Makoto Konno, Yamagata (JP); Noriyuki Kobayashi, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 392 days.

(21) Appl. No.: 10/781,834

(22) Filed: Feb. 20, 2004

(65) Prior Publication Data

US 2004/0169957 A1 Sep. 2, 2004

(30) Foreign Application Priority Data

Feb. 28, 2003 (JP) .......................... P.2003-054228

(51) Int. Cl.
*G11B 17/02* (2006.01)

(52) U.S. Cl. .................................................. 360/99.02
(58) Field of Classification Search ..................... None
See application file for complete search history.

(56) References Cited

U.S. PATENT DOCUMENTS 5,898,539 A * 4/1999 Yokota et al. ........... 360/99.06

* cited by examiner

*Primary Examiner*—Robert S. Tupper
(74) *Attorney, Agent, or Firm*—Whitham, Curtis, Christofferson & Cook, PC

(57) ABSTRACT

A flexible disk drive includes a case and a disk holder provided in the case. A flexible disk is mounted on the disk holder. A part of the disk holder abuts against an inner face of the case. Preferably, the part of the disk holder is a tip end portion of the disk holder. The tip end portion of the disk holder is bent in a slanted direction so as to enlarge an inlet of the disk holder for the flexible disk to be inserted.

5 Claims, 1 Drawing Sheet

FLEXIBLE DISK DRIVE

BACKGROUND OF THE INVENTION

The present invention relates to a flexible disk drive, and more particularly, to an improved structure of a disk holder for holding a flexible disk when the flexible disk is loaded.

As is well known, the flexible disk drive is an apparatus for recording and reproduction of data with respect to a magnetic recording medium (a flexible disk) in a shape of disc which has been inserted into the apparatus. Generally, the flexible disk drive of this type includes a magnetic head for reading and writing the data with respect to the flexible disk which is the magnetic recording medium, a carriage assembly which supports this magnetic head at its tip end so that the magnetic head can move along a radial direction of the flexible disk, a stepping motor which drives the carriage assembly to move along the radial direction, and a DD (direct drive) motor such as a spindle motor which holds the flexible disk and drives it to rotate.

The flexible disk drive of this type is mainly installed in a personal computer of various kinds. However, in case of a portable electronic apparatus (e.g., a laptop computer, a notebook computer, a notebook word processor, etc.), the flexible disk drive is usually separate from and connected to a main body of the apparatus for use as a so-called external type drive.

Recently, there has been a tendency to reduce the thickness of the above described portable type electronic apparatus. Reduction in thickness of the flexible disk drive to be internally installed in or externally connected to the apparatus has been also promoted. In order to attain such reduction in thickness of the flexible disk drive, various regulations and restrictions are imposed on components of the flexible disk drive. In other words, because the restrictions have increased while the thickness has decreased, the design margin will decrease.

Under such circumstances, maintaining strength is a serious problem, particularly in the flexible disk drive of the external type. For example, when an outer force is applied to a cover (a case) of the external type drive, the cover will be flexed and a position of the magnetic head fixed thereto will be lowered. As a result, there is a possibility that the magnetic head and the flexible disk will abut against each other, which is inherent in a flat type flexible disk. The flexible disk drive of the external type has many factors of receiving outer forces, for example, something may be placed on the flexible disk drive or something may strike the drive, and therefore, it is an urgent necessity to solve the problem.

SUMMARY OF THE INVENTION

It is therefore an object of the present invention to provide a flexible disk drive in which mechanical strength can be maintained, and a magnetic head will not butt against a flexible disk even though the drive has been reduced in thickness.

In order to achieve the above object, according to the present invention, there is provided a flexible disk drive, comprising:

a case; and a disk holder, provided in the case, the disk holder on which a flexible disk is mounted, wherein apart of the disk holder abuts against an inner face of the case.

Preferably, the part of the disk holder is a tip end portion of the disk holder. The tip end portion of the disk holder is bent in a slanted direction so as to enlarge an inlet of the disk holder for the flexible disk to be inserted.

In the above configuration, the tip end portion is so designed as to bear the inner face of the case, and flexure of the case will be prevented with strength of the disk holder, even when a load is applied from the above of the case, for example.

Preferably, the disk holder has a pivot at an intermediate position in an insertion direction of the flexible disk.

Here, it is preferable that, the tip end portion pushes the inner face of the case upwardly.

Preferably, the disk holder is formed of a metal sheet.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
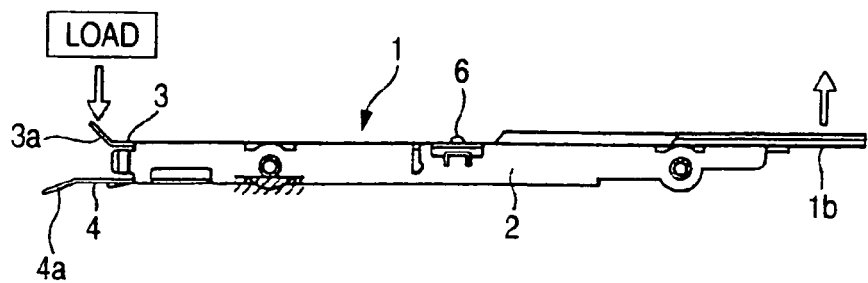
FIG. 1 is a side view of a disk holder which is incorporated in a flexible disk drive according to a first embodiment of the invention.

Now, specific embodiments of a flexible disk drive according to the invention will be described in detail referring to the drawings.

The flexible disk drive has a magnetic head for reading and writing data with respect to a flexible disk which is a magnetic recording medium, a carriage assembly which supports this magnetic head at its tip end in such a manner that the magnetic head can move along a determined radial direction with respect to the flexible disk, a stepping motor which drives this carriage assembly to move along the determined radial direction as described above, a spindle motor which holds the flexible disk and drives it to rotate, and so on. In case of the flexible disk drive of the external type, for example, these elements are contained in a case. Respective structures of the elements will not be described here, because all the elements of known structures can be employed.

The flexible disk drive is provided with a disk holder for the purpose of holding the flexible disk, which is the magnetic recording medium, inside the case, and conducting with stability recording and reproduction of the data with respect to the flexible disk. An example of the disk holder 1 of the flexible disk drive is shown in FIG. 1.

The disk holder 1 includes side plates 2, a top plate 3 and a bottom plate 4, as shown in FIG. 1. The disk holder 1 has a box-like shape having a substantially same longitudinal length as the flexible disk. The top plate 3 and the bottom plate 4 are formed with openings through which the magnetic head is adapted to slidably come into contact with the flexible disk thereby to conduct the recording and reproduction. The bottom plate 4 is further provided with an opening through which a rotary shaft of the spindle motor is adapted to chuck the flexible disk.

One end part of the disk holder 1, namely a left side end in FIG. 1, is formed as an insertion inlet for the flexible disk to be inserted. In this part, a tip end portion 3a of the top plate 3 and a tip end portion 4a of the bottom plate 4 are bent in an oblique direction so as to enlarge the insertion inlet so that the flexible disk can be smoothly inserted.

Figure 2:
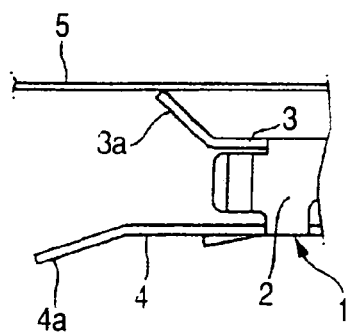
FIG. 2 is a side view of the disk holder showing, in an enlarged scale, an area around an inlet for a flexible disk to be inserted.

FIG. 2 shows an area around the insertion inlet of the disk holder 1 in an enlarged scale. As described above, the tip end portion 3a of the top plate 3 and the tip end portion 4a of the bottom plate 4 are diagonally bent. In FIG. 2, the tip end portion 3a of the top plate 3 has such bending angle and length that the tip end portion 3a may be positioned at a same level as the case 5, and has such a structure that the tip end portion 3a may be in contact with an inner face of the case 5 to bear it. The disk holder 1 is formed of a sheet metal, and the top plate 3 is formed of the same and applied to the disk holder 1. Accordingly, the tip end portion 3a of the top plate 3 has high mechanical strength, and the strength of the disk holder 1 (the tip end portion 3a of the top plate 3) can prevent the case 5 from being flexed with a load from above.

Moreover, the disk holder 1 is mounted to an internal mechanism in the case 5 through a support shaft 6, which functions as a pivot. When the load from above is applied as described above, the tip end portion 3a of the disk holder 1 will bear the flexure of the case 5. On this occasion, the forward end (near the insertion inlet of the flexible disk) of the disk holder 1 is depressed. Then, the disk holder 1 rotates around the support shaft 6 as the pivot by an action of a lever, and a backward part 1b of the disk holder 1 is lifted. As a result, a backward part of the case 5 is lifted. In the flexible disk drive, one of the magnetic head assemblies is fixed to a side of the case 5. Therefore, when the backward part of the case 5 is lifted, the magnetic head assembly is also lifted accordingly, and functions so that butting between the magnetic head and the flexible disk may be prevented.

Figure 3:
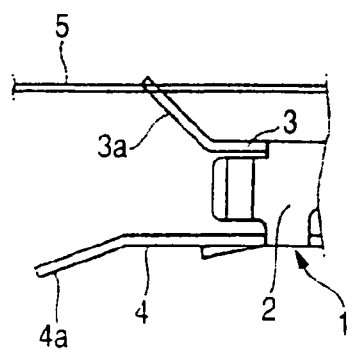
FIG. 3 is a side view showing the disk holder in a modified shape according to a second embodiment of the invention.

Although the embodiment to which the invention is applied has been described above, it is needless to say that the invention is not limited to this embodiment. For example, in the first embodiment, the bending angle and length of the tip end portion 3a of the top plate 3 is set so that the tip end portion 3a may be positioned at the same level as the case 5, and may come into contact with the case 5. However, the bending angle and length may be set in such a manner that the tip end portion 3a of the top plate 3 may be overlapped with the case 5, as shown in FIG. 3. In this case, the tip end portion 3a of the top plate 3 will push the case 5 upward, and this will enable the tip end portion 3a to resist the load from the above, furthermore. Alternatively, the tip end portion 3a of the top plate 3 need not be necessarily in contact with the inner face of the case 5, but a slight clearance would be permitted. However, a desired effect would not be obtained with a too large clearance.

As has been fully described above, according to the invention, it is possible to provide the flexible disk drive which is excellent in mechanical strength, and in which the magnetic head will not strike the flexible disk, even though the flexible disk drive has been reduced in thickness.

What is claimed is:

1. A flexible disk drive, comprising:
   a case; and
   a disk holder, provided in said case, said disk holder on which a flexible disk is mounted,
   wherein a part of said disk holder abuts against an inner face of said case,
   wherein said part of said disk holder is a tip end portion of said disk holder, and
   wherein said disk holder further comprises a backward part located at an opposite end from said tip end portion, said backward part pushing said inner face of said case upwardly when a downward pressure is applied to said tip end portion.

2. The flexible disk drive as set forth in claim 1, wherein said tip end portion of said disk holder is bent in a slanted direction so as to enlarge an inlet of said disk holder for said flexible disk to be inserted.

3. The flexible disk drive as set forth in claim 1, wherein said disk holder has a pivot at an intermediate position in an insertion direction of said flexible disk.

4. The flexible disk drive as set forth in claim 2, wherein said tip end portion pushes said inner face of said case upwardly.

5. The flexible disk drive as set forth in claim 1, wherein said disk holder is formed of a metal sheet.

\* \* \* \* \*